(12) United States Patent
Helle et al.

(10) Patent No.: US 6,902,201 B1
(45) Date of Patent: Jun. 7, 2005

(54) DEVICE AND METHOD FOR MOUNTING A SADDLE HUB ON A PIPE AND CORRESPONDING TAP

(75) Inventors: Jacky Helle, Friville-Escarbotin (FR); Alain Calca, Bouvraincourt sur Bresles (FR)

(73) Assignee: Saint-Germain & Straub, S.A., (FR)

( * ) Notice: Subject to any disclaimer, the term of this patent is extended or adjusted under 35 U.S.C. 154(b) by 0 days.

(21) Appl. No.: 09/582,006

(22) PCT Filed: Dec. 18, 1998
(Under 37 CFR 1.47)

(86) PCT No.: PCT/FR98/02776

§ 371 (c)(1),
(2), (4) Date: Oct. 30, 2000

(87) PCT Pub. No.: WO99/32823

PCT Pub. Date: Jul. 1, 1999

(30) Foreign Application Priority Data

Dec. 19, 1997 (FR) .................................. 97 16440

(51) Int. Cl.[7] .............................................. F16L 41/00
(52) U.S. Cl. ..................... 285/197; 285/199; 137/317
(58) Field of Search ................................ 285/197, 198, 285/199; 137/317, 318

(56) References Cited

U.S. PATENT DOCUMENTS

| | | | | |
|---|---|---|---|---|
| 351,397 A | * | 10/1886 | Payne | .................. 408/111 |
| 534,881 A | * | 2/1895 | Hearne et al. | .............. 137/318 |
| 1,057,708 A | * | 4/1913 | Chapin | ...................... 285/197 |
| 1,484,469 A | * | 2/1924 | Brucelarie | .................... 138/92 |
| 2,884,265 A | * | 4/1959 | Boughton | ................... 285/197 |
| 3,104,456 A | * | 9/1963 | Powell, Jr. | ............... 29/890.11 |
| 3,252,475 A | * | 5/1966 | Jones | .......................... 137/318 |
| 3,471,176 A | * | 10/1969 | Gilchrist | ..................... 285/111 |
| 3,762,743 A | * | 10/1973 | Hawle | ......................... 285/197 |
| 3,779,272 A | * | 12/1973 | Dunmire | ................ 137/315.01 |
| 3,894,707 A | * | 7/1975 | Heard | ....................... 248/230.9 |
| 3,999,785 A | * | 12/1976 | Blakeley | ..................... 285/111 |
| 4,606,558 A | * | 8/1986 | Davidson | ................... 285/21.3 |
| 4,638,834 A | * | 1/1987 | Montgomery | .......... 137/315.01 |
| 4,761,024 A | * | 8/1988 | Ewen | ........................... 285/93 |
| 4,768,741 A | * | 9/1988 | Logsdon | ...................... 248/62 |
| 5,199,749 A | * | 4/1993 | Corcoran | .................... 285/197 |
| 5,344,111 A | * | 9/1994 | Gantzert | .................. 248/274.1 |
| 5,360,241 A | * | 11/1994 | Gundy | ....................... 285/197 |
| 5,697,650 A | * | 12/1997 | Brown | ........................ 285/197 |
| 6,202,977 B1 | * | 3/2001 | Chapman | .................... 248/505 |

FOREIGN PATENT DOCUMENTS

DE          27 43 978 A1    4/1979

(Continued)

Primary Examiner—Eric K. Nicholson
(74) Attorney, Agent, or Firm—Young Law Firm, P.C.

(57) ABSTRACT

The invention concerns a method whereby after the saddle hub (3) has been placed on the pipe (2a, 2b, 2c), the open and deformable ring (4) is closed back on the pipe, the screw (5) is folded down and the screw is clamped to complete the locking of the plate (3) whereon is mounted the device (12, 29) for boring the pipe. The invention is useful for branch channel connection on a pipe (2a, 2b, 2c).

18 Claims, 4 Drawing Sheets

FOREIGN PATENT DOCUMENTS

| | | |
|---|---|---|
| DE | 29 49 932 A1 | 4/1982 |
| DE | 3812189 * | 10/1989 |
| DE | 94 08 836 U | 10/1994 |
| FR | 2 165 360 A | 8/1973 |
| FR | 2 486 195 A | 1/1982 |
| GB | 1 091 927 A | 11/1967 |
| GB | 2181203 * | 4/1987 |

* cited by examiner

DEVICE AND METHOD FOR MOUNTING A SADDLE HUB ON A PIPE AND CORRESPONDING TAP

BACKGROUND OF THE INVENTION

1. Field of the Invention

The present invention relates to the mounting of a bypass saddle hub on a pipe, particularly a pipe to supply water or other fluid, liquid or gas. Importantly, the invention relates to the device to mount a saddle hub comprising two lateral attachment means.

2. Description of the Related Art

Often, conventional saddle hubs are saddle hubs of bypass taps or systems to close pipes, equipped with two lateral attachment means disposed substantially opposite one another in such a manner as to enable the saddle hub to be tightened on the pipe with a substantially even force over the entire contact surface of the saddle hub. The saddle hub assembly and the tightening means form a ring.

Conventionally, the attachment means are constituted of screws and nuts that tighten the saddle hub on the pipe by means of a rein. For a given internal nominal diameter, the outer diameter varies according to the building material such as cast-iron, steel, cement, plastic materials etc. To adapt to such variations in the outer diameters with this type of attachment, it is necessary to change the ring (assembly of the saddle hub and the rein) to attach the saddle hub on the pipe. On some models of rings, the length of the threaded shaft of the screws and the shape of the saddle hub enable them to adapt themselves to small variations in the outer diameters of the pipes by more or less tightening the screws.

Therefore, conventional rings are constituted by two half portions, and two screws and two nuts or two tapped holes.

Known saddle hubs have the major disadvantage of requiring the rein and the saddle hub to be changed to adapt to large variations in the outer diameter of the pipes corresponding to different nominal diameters. Each pipe nominal diameter generally requires at least a different rein, even if the rings are of the same type. Such a plurality of rings has the disadvantage of requiring the maintenance of large stockpiles to fit to various pipes.

Moreover, for the large diameters, notably greater than 200 mm, conventional reins are large and cumbersome, rendering the disposition and the attachment of the saddle hub in the open trench around the pipe difficult. Therefore, the work necessary to mount to saddle hubs with conventional reins on large diameter pipes is long and tiring.

SUMMARY OF THE INVENTION

The invention mainly aims to allow in a simple and fast manner, the mounting of a bypass on a mains pipe or not that transports a fluid at great pressure. And this without maintaining a large stockpile of parts.

Toward that end, the invention has for an object a mounting device of the aforesaid type in which the tightening means is an open and deformable bracelet. The saddle hub and the bracelet form the rein; the bracelet comprises at least three attachment means disposed at regular intervals from one end of the bracelet to the other end, enabling it to adapt itself to different pipe outer diameters by tightening at least two of the three attachment means.

More specifically, the attachment means of the bracelet are or comprise openings configured to enable the passage and retention of the attachment means of the saddle hub. The openings are disposed at regular intervals from one end to the other of the bracelet. Disposing the openings at regular intervals allows the length of the bracelet to be trimmed according to the diameter of the pipe.

According to other characteristics and so that the tightening does not require more than one wrench such as a flat wrench or a socket wrench, the bracelet is pivotally mounted on the saddle hub, mounted such that a closed pull down of one end of the bracelet around a tee that constitute one of the lateral attachment means of the saddle hub, an opening of the bracelet being arranged at the end of the pull down to allow the passage of the connecting portion of the tee of the saddle hub; the bracelet is equipped with a reversible attachment means such as a screw crossing another opening located at its second end, said screw attaching the second end of the bracelet to the second attachment means of the saddle hub.

The closed pull downs at the end of the bracelet are disposed on the surface of the bracelet intended to be tightened on the pipe in such a manner as to pinch at least one pull down between said pipe and the outside edges of the bracelet.

With the aim of obtaining after preparation a rein that forms a one-piece integral assembly, the second end of the bracelet according to the invention is pulled down and closed around a mobile retaining portion having a drilled and tapped retaining portion that forms a mounted sliding nut that turns the pull down at the end of the bracelet. The screw on the one hand attaches onto the nut after having traversed the openings at the end of the pull down of the bracelet, and on the other hand, the head of the screw is pulled down and tightens itself on two fingers configured in a fork shape to constitute the second lateral attachment means of the saddle hub. The head of the screw is maintained in the attachment axis by a washer that defines a flat surface and another convex surface is mounted on the screw, the flat surface in contact with the head of the screw and the convex surface cooperate with a hollow convex imprint disposed in the hollow of said fork.

These characteristics increase the resistance of the attachment means while allowing a large clearance of the screw and the bracelet. They avoid the congestion of two half portions of the conventional reins with screws, thick reins and the dismantling into several parts, which engender the risk of losing and confusing different rein elements of different sizes with parts that look alike.

So as to obtain a waterproof seal upon attaching the connection of loaded pipes, the bypass saddle hub of the pipe notably loaded, defines the substantially in its center an outlet tube having an axis that is radial with respect to the axis of the pipe. A supple gasket formed of a flowing material such as rubber is attached in a housing and a sleeve is adjusted in the tube, a second gasket is placed in the continuation of the sleeve in contact with the attachment means of the bypass connection, by means, for example of a tapping, the two gaskets and the sleeve presenting an internal diameter that is appreciably higher than the diameter of the drilling to form a bypass in the pipe. The use of the two gaskets and of the sleeve allows the mounting to be more or less tightened relative to the ring according to the diameter of the pipe.

Elongated openings longitudinally disposed relative to the length of the bracelet allow placing said bracelet by rotation of a quarter turn after the penetration of the T.

To resist aerial corrosion and grounds corrosion, the saddle hub is notably made of bronze, the bracelet mainly comprising a band of non-corrodible material that may be sectioned to a length suitable to encircle the pipe. The non-corrodible bands may be coated with an inert material such as a composition having a powdered epoxy base. The bands of the bracelet may also be made of plastic material.

These coated corrosion-proof bands stand up very well to all chemical corrosion of pipes having a ferrous base.

The saddle hub, rein, screw, washer and nut resist the aerial corrosion that they are subjected to while in stock before they are fitted onto the pipe. This bracelet resists more than one thousand hours in a salty fog without any corrosion.

The Invention also has for an object a method to mount a device for the mounting of an auxiliary bypass pipe on a supply water pipe which is loaded or not, characterized in that said pipe having such a diameter, lower than the distance separating the two lateral attachment means of the saddle hub, largely equal to the distance separating the two lateral attachment means of the saddle hub that is greater than the distance separating the two lateral attachment means of the saddle hub, the method including following at least the successive steps:

preparation of a ring such as defined above, the bracelet being dimensioned according to the diameter of the pipe, presentation and shaping of the ring on the pipe, tightening of the assembly in its operating position, screwing and tightening of the mounting device on the saddle hub, mounting, in a waterproof manner, of a boring machine having a drill on the upper tube of the chamber of the mounting device, boring the pipe, removing the boring machine, locking the mounting device, connecting the bypass system to the auxiliary pipe.

The invention also has for object a pipe bypass comprising a body and a saddle hub, the body and the saddle hub being implemented as a single piece assembly or an integral assembly and comprising at least two lateral attachment means, the attachment means being radial with respect to the axis of the body of the tap, being disposed substantially opposite one relative to the other and being equipped with a mounting device on the pipe, characterized and that said device is such as described above.

BRIEF DESCRIPTION OF THE DRAWINGS

A nonrestrictive example of the invention will now be described with reference to the drawings annexed herewith in which.

DESCRIPTION OF THE PREFERRED EMBODIMENTS

Figure 1:
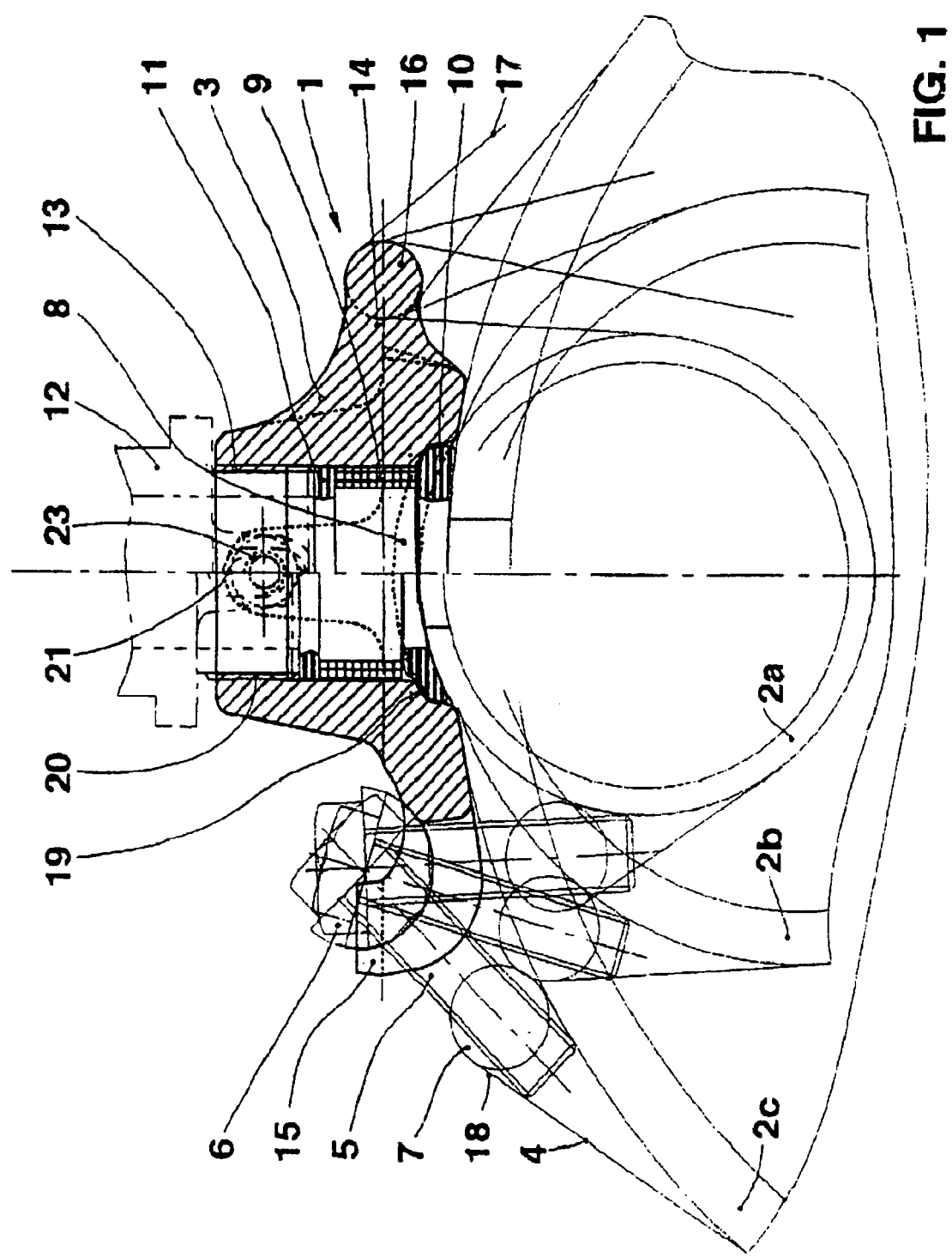
FIG. 1 represents in a vertical sectional schematic a ring corresponding to the invention attached to pipes having three different outer diameters.

The ring 1 fitted onto the pipes 2a, 2b, 2c of different outer diameters represented in FIG. 1 comprises a saddle hub 3, a corrosion-proof metal band 4 forming an open and deformable bracelet. A tightening screw 5 fixed to a metallic nut 7 bound to the band 4 revolves on a washer 6 in the shape of a half-sphere. The saddle hub 3 includes an axial tube 8 provided with an intermediary sleeve 9 adjacent to the two gaskets 10, 11. A tap 12 of the fluid circulating in the pipe 2a, 2b, 2c is screwed on the saddle hub 3 by means of its threaded end 13.

The saddle hub 3 comprises two lateral attachment means 14, 15, the attachment means 14 is a tee whose cylindrical end 16 defines an axis that is parallel to the axis of the pipe. The other lateral attachment means 15 is disposed opposite to the attachment means 14. An end 17 of the band 4 is locked down around the end 16 of the tee of the saddle hub 3, the other end of the band 18 is locked down around the cylindrical nut 7. The screwing of the screw 5 in the nut 7 maintains the ring tight against the pipe. If the pipe 2a is of small diameter, the tightened nut 5 is pulled down toward the axis of the tube 8. The tube 8 defines a radial axis relative to the axis of the pipe, a lower housing 19 of the pipe facilitates the fitting of the lower gasket 10 compressed in the housing 19 between the sleeve 9 and the surface of the pipe 2a. The lower gasket 10 insures a waterproof seal between the pipe 2a and the sleeve 9. If the saddle hub 3 is attached on a pipe 2b of average external diameter, the screw 5 turns onto the washer in the shape of a half sphere 6 and is more opened than it would otherwise be when attaching the saddle hub 3 on a pipe 2a of smaller diameter. The lower gasket 10 conforms to the surface of the pipe 2b. Even though the outer pipe 2b having an outer diameter that is greater than the pipe 2a sinks less deeply in the tube 8, the waterproof seal between the pipe 2b and the sleeve 9 is insured by a stronger tightening of the tap on the saddle hub. This tightening causes the compression of the sleeve 9 on the gasket 10. In this manner, a waterproof seal is maintained between the sleeve 9, the gasket 10, and the pipe 2b. In the case wherein the saddle hub 3 is attached to a pipe having a large diameter 2c, the screw 4 pivots more and the tap is itself further tightened in such a manner as to push the sleeve 9 on the lower gasket 10 until a waterproof seal is formed between the gasket 10 and the sleeve 9.

The saddle hub 3 is always maintained on the tightened on the pipe 2c and the lower gasket 10 also maintains a waterproof seal between the pipe 2c and the sleeve 9. The tap 12 is screwed into the tube 8 with the threading 20. The tap 12 compresses the upper gasket 11 on the sleeve 9 and is locked by locking screw 21. The upper gasket 11 insures a waterproof seal between the tap 12 and the sleeve 9.

Figure 2:
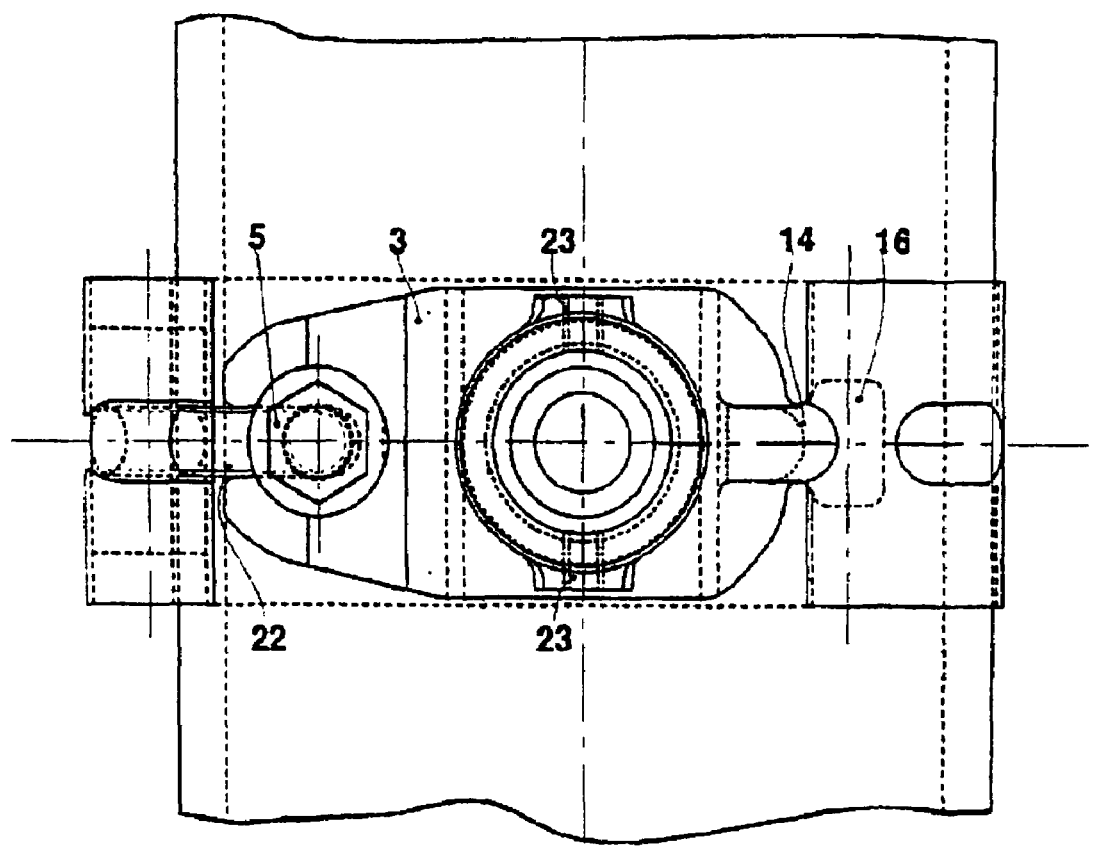
FIG. 2 represents a saddle hub according to the invention as seen from above, with its bracelet on the pipe.

As shown more particularly in FIG. 2, the attachment means 15 of the saddle hub 3 is constituted by two fingers that form a fork. The shaft of the screw 5 passes by the groove 22 formed between the two fingers of the fork 15.

The lateral opening of this groove allows the rotation and the passage of the threaded shaft of the screw that is already engaged in the cylindrical nut 7. A spherical hollow imprint arranged in the hollow of the fork 15 forms the housing of the washer 6 by allowing it to function as a kneecap while providing high traction for the screw 5.

The end of the saddle hub in the shape of the fork 15 allows the rapid mounting thereof without having to remove the screw of its cylindrical nut, thereby avoiding the loss of any part, the ring assembly being a single piece unit at the moment of mounting.

Two tapped borings are disposed radially with respect to the tube 8 into the upper portion of the saddle hub 3. These borings receive a locking screw 21 that prevents the loosening of the tap 12 with respect to the saddle hub 3 during manipulations of the tap 12.

Figure 3:
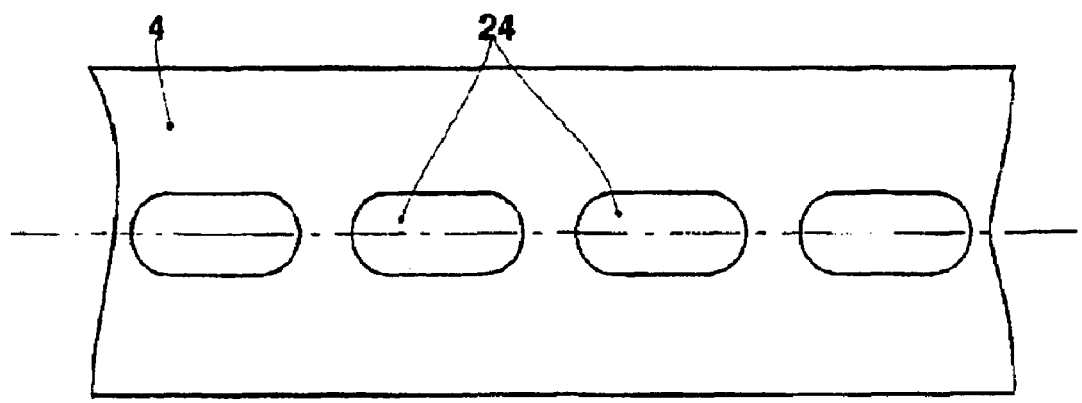
FIG. 3 is a corrosion-proof band, part of an open-ended bracelet according to the invention.

The leaf band 4 comprises openings 24 disposed at regular intervals from one end to the other, such as shown in FIG. 3. These openings 24 are elongated and disposed longitudinally with respect to the length of the band 4. The shapes and positions of the openings 24 enable the threading of the end 17 of the band on the tee 14 and to attach it by rotation and clamping down. These openings also allow the passage of the shaft of the screw 5, the cylindrical nut 7 in the direction of the saddle hub 3 and the end of the shaft that passes the cylindrical nut 7.

According to another embodiment, some of the openings need not be elongated.

Figure 4:
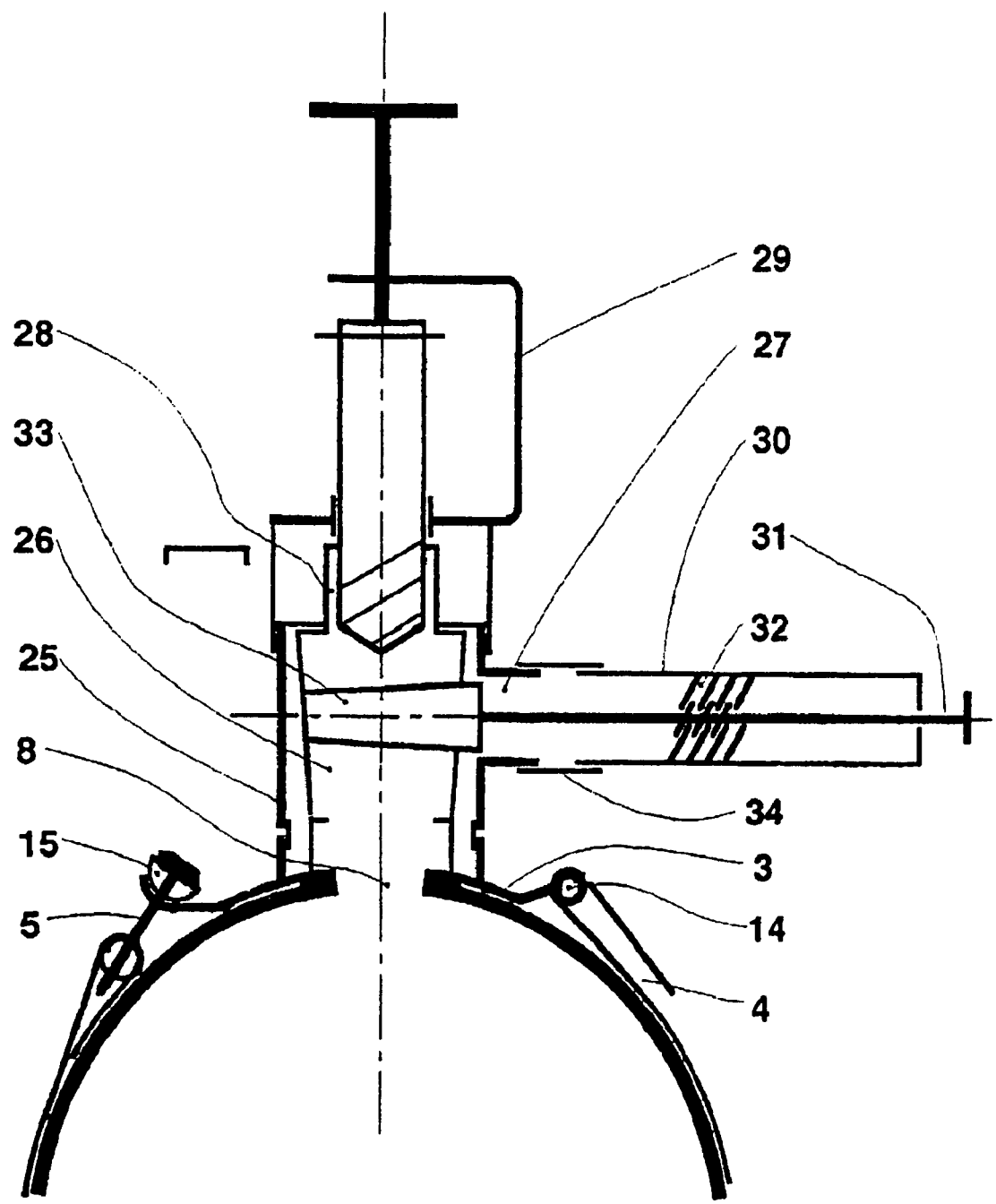
FIG. 4 schematically represents a mounting by means of a tap with a device according to the invention.

FIG. 4 represents a mounting of a main conduit of a bypass tap having a valve of the type having a vertical maneuvering axis 12. The constituent elements of the attachment device are identified by the same reference numerals as are the corresponding elements of the attachment device represented in FIGS. 1 to 3. The supply to tube 8 is attached in a waterproof manner on the pipe 2 by tightening the band 4 on the lateral attachment means 14, 15 of the ring 1. The tube 8 emerges in an open chamber 26 in the upper portion of the body of the tap 25. In its upper portion, the open chamber 26 emerges into two tubes, a lateral tube 27 and a vertical tube 28.

A boring machine 29 is mounted on the body 25 along the axis of the tube 28 of the open chamber 26 and of the tube 8. A shutter 30 is mounted on the tap 12 facing the lateral tube 27. The shutter is constituted of a screw 31 guided in a sheath 32 the screw displacing a shutter head 33 which can enter into the sheath 32 prolonged by a cross piece 34. The head of the shutter may also leave the sheath 30 to shutter in a waterproof manner the upper portion of the chamber 26.

The attachment and the mounting according to the invention of a main tap are carried out in the following manner, a band 4 pierced at regular intervals with elongated openings is trimmed to a predetermined length to correspond to the outer diameter of the water inlet pipe. The band is coated of a material constituted by a base of epoxy powder, which rounds off the sharp edges. An end of the band 4 is introduced in the tee 14 by an elongated opening from the end of the band 4. A rotation locks the band on the tee 14. The cylindrical nut 7 is placed at the other end of the band 4. The two ends are locked down, an elongated opening constituting an opening with respect to each end. The screw 5 locks the nut 7 by way of the second opening from the end of the band 4, second opening that forms the end opening from the locking down of the edge of the end 18 of the band. The saddle hub 3, the band 4 forming the bracelet and the screw 5 now forming a single assembly, the bracelet may pivot with respect to the saddle hub 3 on the cylindrical portion of the tee 16.

A single person is sufficient to place the ring 1 on the pipe 2, to close the bracelet around the pipe, to place and tighten the screw 5 in the groove 22 that tightens and immobilizes the ring on the pipe 2. The tap 12 is screwed onto the saddle hub 3 in the embodiment in which the saddle hub 3 and the tap 12 are constituted by separate pieces. The boring machine 29 and the shutter 30 are mounted on the tap 12. Then, the pipe 2 is pierced, after which the drill of the boring machine is brought back up. The head of the shutter 33 is advanced and insures a watertight seal of the upper portion of the open chamber 26. The boring machine 29 is removed. A stopper closes the tube 28. The head of the shutter is backed up and closing the tap 12 allows the shutter to be taken off, followed by the mounting of the principal pipe 2a, 2b, 2c to an auxiliary bypass pipe.

According to another embodiment, the saddle hub 3 and the body 25 of the tap 12 of the bypass pipe are configured as a single assembly presenting an inlet configured to be attached in a waterproof manner onto the pipe 2a, 2b, 2c, said inlet tube emerging in an open chamber comprising in its upper portion a lateral outlet tube 27, the chamber 26 comprising in an upper vertical tube 28 configured to be closed receiving in a waterproof manner a boring machine 29.

Figure 5:
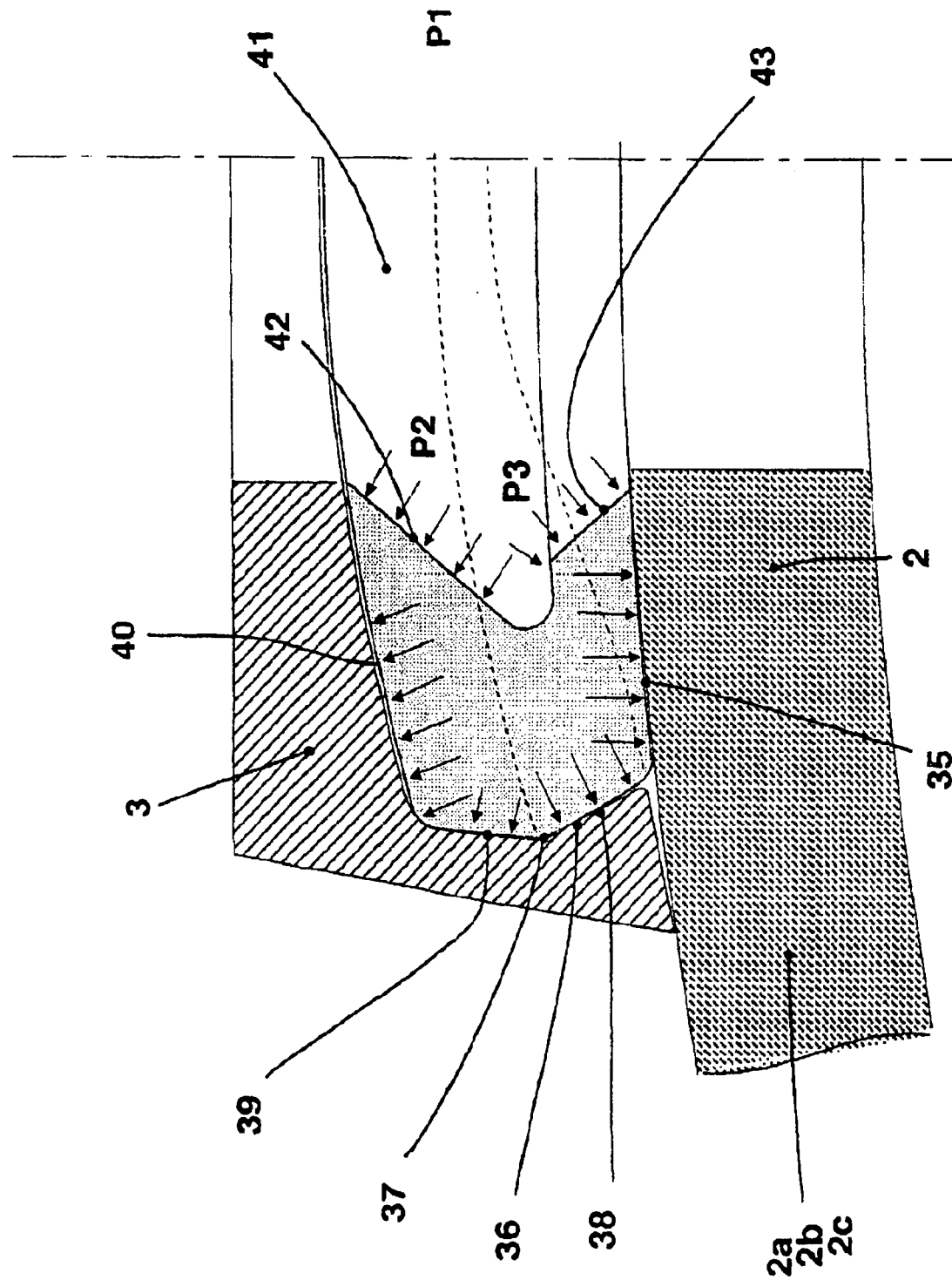
FIG. 5 shows a ring gasket according to the invention as seen in a half sectional view.

According to another embodiment, the waterproof seal between the ring and the pipe 2 is insured by a one-piece lipped gasket such as is shown in FIG. 5. The lower surface 35 of the gasket is concave with a radius of curvature at least equal to the radius of curvature of the pipe 2. Its peripheral portion 36 presents an edge 37 that separates it into at least two surfaces 38, 39. The upper surface 40 of the gasket is provided with a radius of curvature that gives it a convex appearance. The peripheral surfaces and upper surfaces 38, 39, 40 of the lipped gasket are configured to lodge themselves within the and imprint foreseen in the sole of the saddle hub 3. The internal portion 41 that delimits the hollow of said gasket and presents an open angle separating at least two surfaces 42, 43 of different slopes. The upper inside surface 42 having an orientation towards the top and the lower inside face 43 having an orientation toward the bottom and the pressure of the fluid P1 passing in the hollow of the lipped gasket may be decomposed into two constituent components of which one component P2 is directed toward the top of the imprint and another component P3 is directed toward the surface of the pipe 2 by way of the external surfaces of the gasket. The gasket is configured to maintain the waterproof seal with the pipes 2a, 2b, 2c of various diameters by varying the intensity and placement of the pressure and the compression on the pipe 2a, 2b, 2c whatever its diameter.

Although the presents invention has been described with respect to very particular structures, the invention is not limited thereby and one may make numerous variations such as for example different combinations of the embodiments represented in the drawings or described hereinabove without departing from the scope of the present invention.

The reference numbers inserted after the technical characteristics in the claims are for the sole purpose of facilitating the comprehension of the claims and in no way limit the scope thereof.

What is claimed is:

1. An assembly for mounting and sealing a saddle on a pipe, the assembly comprising:
   a saddle hub, the saddle hub including lateral attachment means disposed on each side of the saddle hub, the saddle hub defining an opening having an axis that is aligned with a radial axis of the pipe, the saddle hub including a first gasket, a sleeve mounted on the first gasket and a second gasket mounted on the sleeve and in contact with the attachment means;
   a saddle hub mounting device, the saddle hub mounting device including tightening means for tightening the saddle hub, the tightening means being configured to cooperate with the lateral attachment means and including an open and deformable bracelet, the bracelet including a flat and flexible band that is configured to be installed on the saddle hub by rotation, the flat and flexible band defining a plurality of spaced openings to enable the saddle hub to fit pipes of various outer diameters by attachment to the lateral attachment means of the saddle hub through selected openings in the bracelet, the saddle hub and the bracelet forming a ring, the lateral attachment means being configured to enable the saddle hub to fit pipes of different outer diameters by attaching and tightening to the tightening means.

2. The assembly of claim 1, wherein the saddle hub is a bypass saddle hub.

3. The assembly of claim 1, wherein the saddle hub forms part of a closing tap.

4. The assembly of claim 1, wherein the attachment means includes a thread tapping.

5. The assembly of claim 1, wherein the first and second gaskets and the sleeve define an internal diameter that is larger than the bypass opening of the pipe.

6. The assembly of claim 1, further comprising a seal disposed between the ring and the pipe, the seal including a lipped gasket that defines a concave lower surface defining a radius of curvature that is at least equal to a curvature of the pipe, the lipped gasket including a peripheral portion that includes an edge delimiting two surfaces, an upper surface of the lipped gasket defining a convex appearance.

7. Assembly according to claim 6, wherein the peripheral and upper surfaces of the lipped gasket are disposed in a space defined under a sole of the saddle hub, the lipped gasket defining a hollow portion including an upper face facing away from the pipe and a lower face facing toward the pipe, the upper and lower faces having different slopes.

8. Assembly according to claim 7, wherein the lipped gasket is configured such that a pressure of fluid crossing the hollow portion of the lipped gasket is separated into a first fluid pressure component directed toward the upper face and a second fluid pressure component directed toward the lower face, the lipped gasket being configured to seal with pipes of various diameters by varying an intensity and place of the fluid pressure and a compression of the gasket on the pipe.

9. Assembly according to claim 8, wherein the saddle hub is configured to contact the pipe upon compression of the gasket.

10. Assembly according to claim 1, wherein the band is configured to be dimensioned according to an outer diameter of the pipe onto which the saddle is to be fitted.

11. Assembly according to claim 1, wherein an end of the bracelet is clamped down on a cylindrical nut by a screw inserted through an opening defined in the bracelet.

12. Assembly according to claim 11, wherein a head of the screw is configured to press the end of the bracelet toward the lateral attachment means of the saddle hub.

13. Assembly according to claim 11, wherein at least one of the lateral attachment means defines two fingers arranged in a shape of a fork.

14. Assembly according to claim 1, wherein one of the lateral attachment means is shaped as a T and wherein one end of the bracelet is mounted by rotation on the saddle hub by a nut and screw around the T-shaped lateral attachment means and wherein another end of the bracelet is attached to the other one of the lateral attachment means.

15. Assembly of claim 1, wherein the openings are defined from end to end of the bracelet at regular intervals.

16. Assembly of claim 13, further comprising a washer configured to cooperate with the screw, a first surface of the washer being flat and a second surface of the washer being convex, the washer being mounted on the screw such that the first flat surface is in contact with a head of the screw and such the convex second surface is arranged in a hollow defined between the two fingers of the fork.

17. Assembly of claim 1, wherein the saddle hub includes bronze and wherein the band is formed of a non-corrodible material coated with an inert material.

18. Assembly of claim 17, wherein the inert material includes an epoxy-based powder composition.

* * * * *